April 6, 1965   E. H. FREDRICKSON   3,176,796
CONTROL MECHANISM FOR SPRING CLOSE CIRCUIT BREAKERS
Filed July 15, 1963   6 Sheets-Sheet 1

INVENTOR.
EINAR H. FREDRICKSON
BY
OSTROLENK, FABER, GERB & SOFFEN
ATTORNEYS

INVENTOR.
EINAR H. FREDRICKSON
BY
OSTROLENK, FABER, GERB & SOFFEN
ATTORNEYS

April 6, 1965 E. H. FREDRICKSON 3,176,796
CONTROL MECHANISM FOR SPRING CLOSE CIRCUIT BREAKERS
Filed July 15, 1963 6 Sheets-Sheet 3

INVENTOR.
EINAR H. FREDRICKSON

BY

OSTROLENK, FABER, GERB & SOFFEN
ATTORNEYS

April 6, 1965   E. H. FREDRICKSON   3,176,796
CONTROL MECHANISM FOR SPRING CLOSE CIRCUIT BREAKERS
Filed July 15, 1963   6 Sheets-Sheet 4
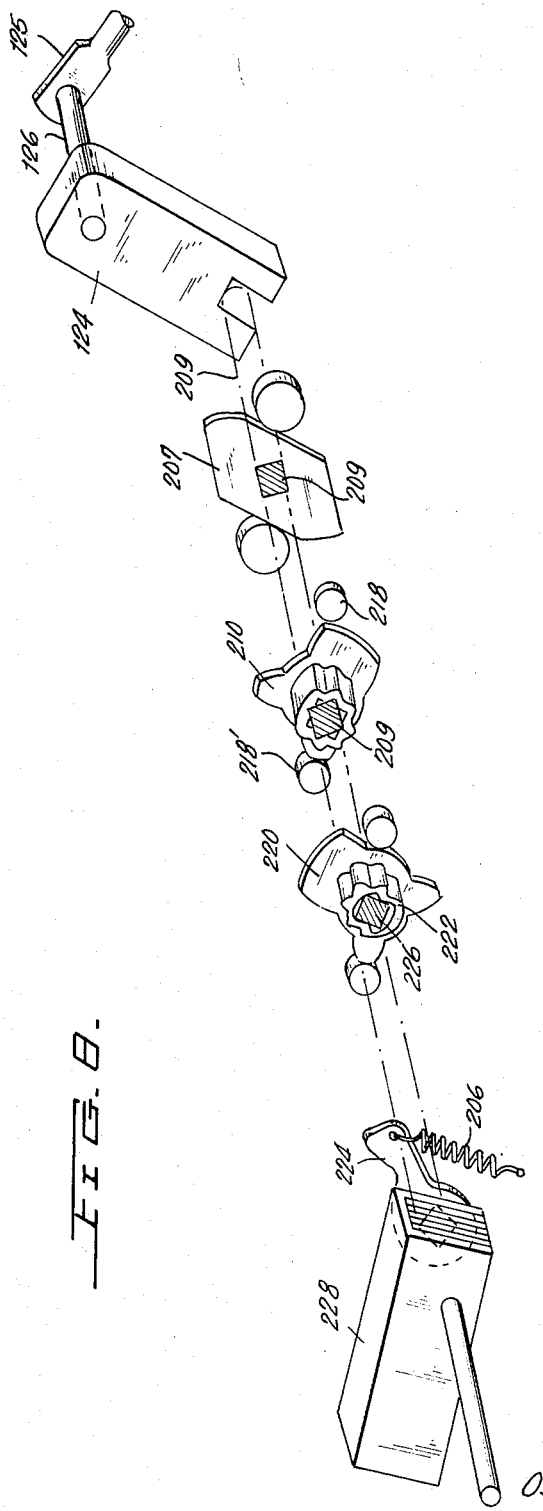
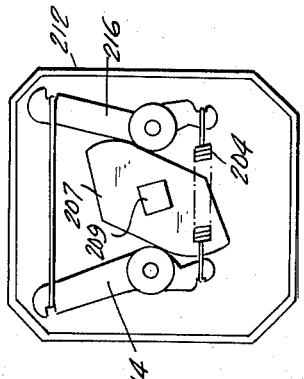
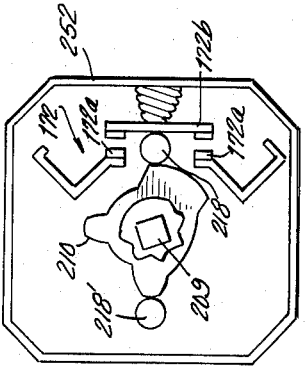
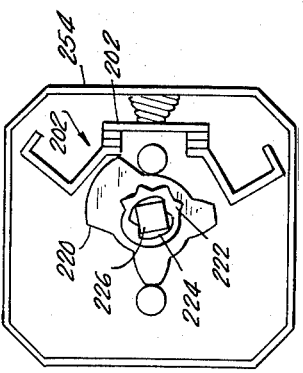
INVENTOR.
EINAR H. FREDRICKSON
BY
OSTROLENK, FABER, GERB & SOFFEN
ATTORNEYS

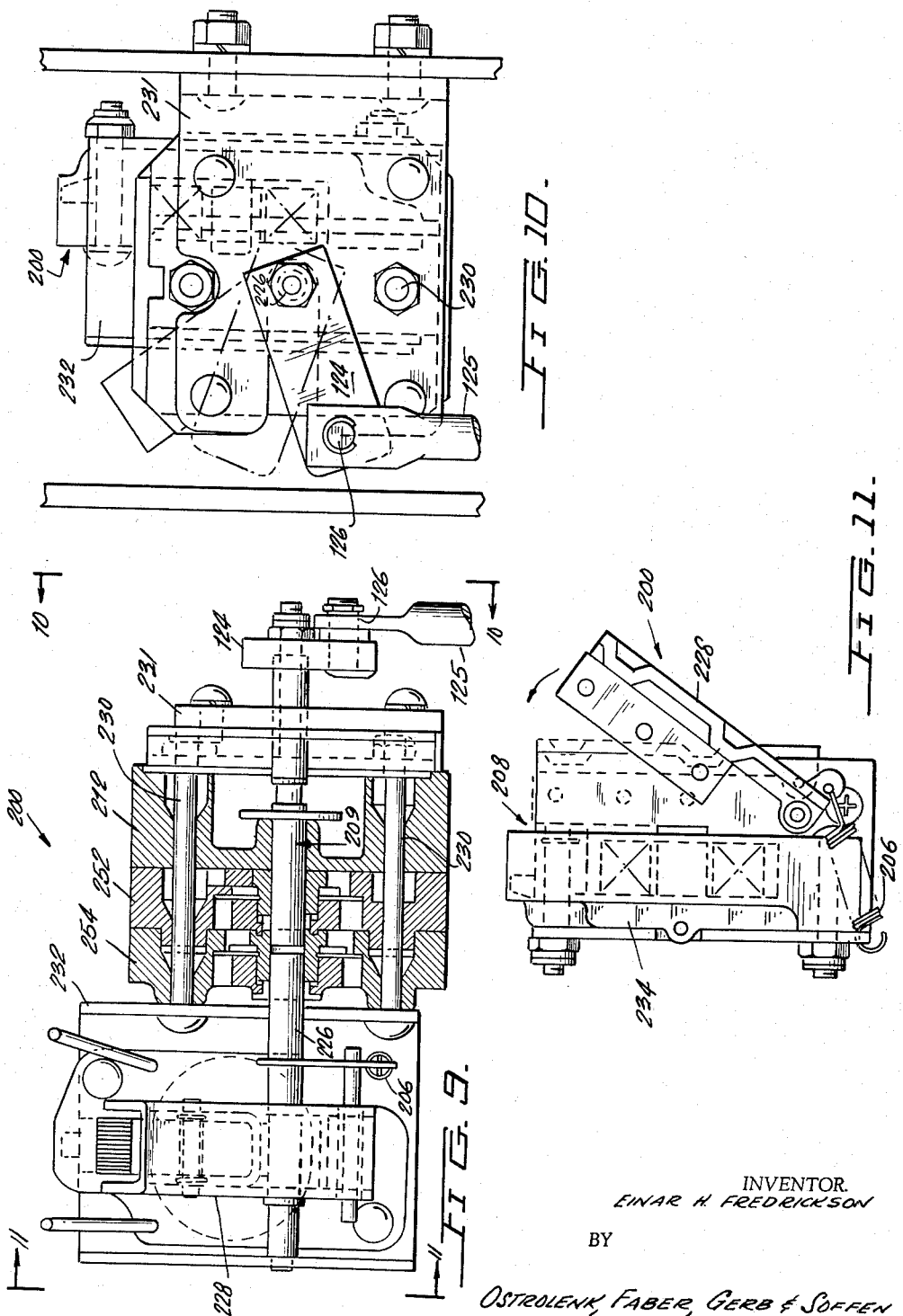

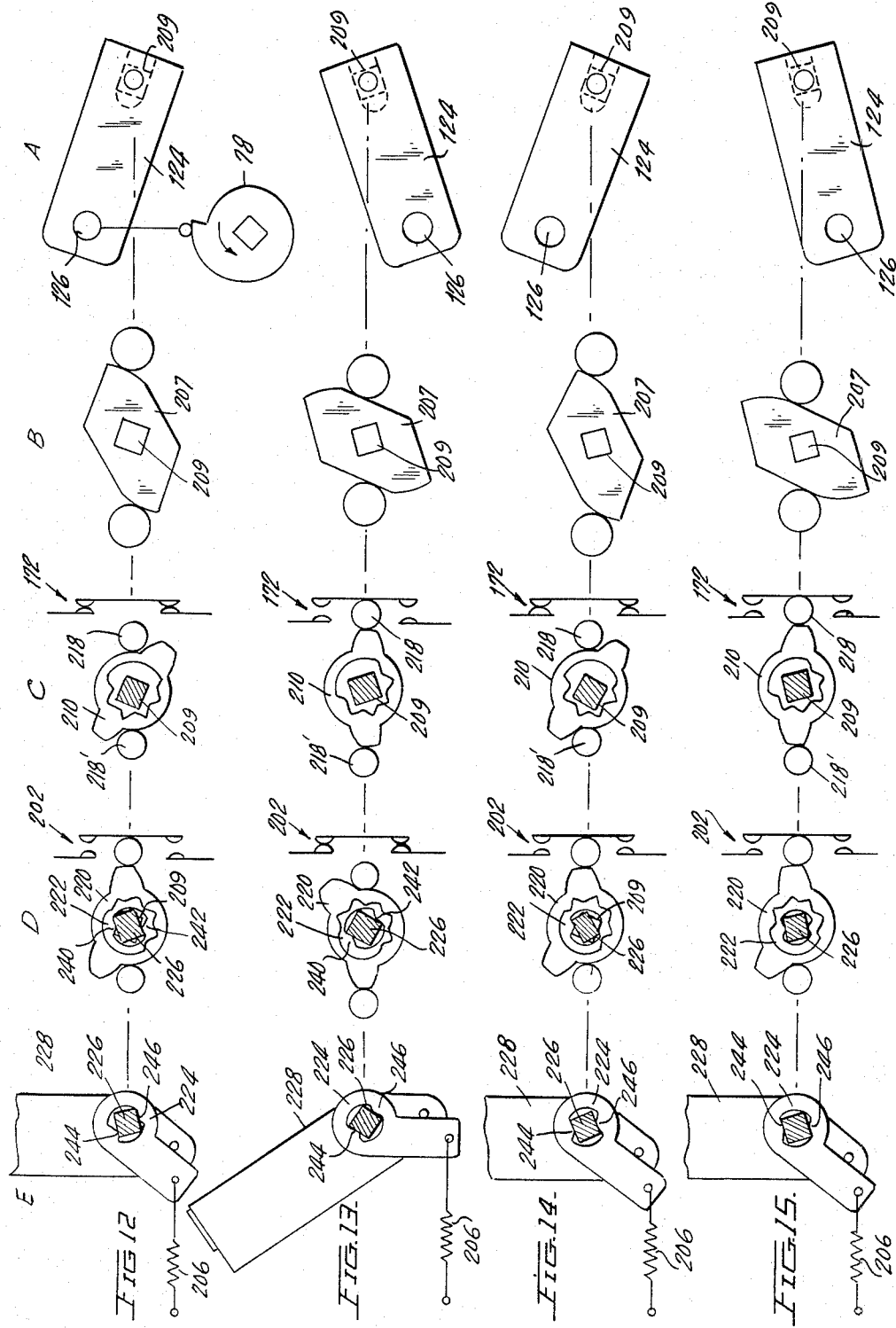

United States Patent Office

3,176,796
Patented Apr. 6, 1965

3,176,796
CONTROL MECHANISM FOR SPRING CLOSE
CIRCUIT BREAKERS
Einar H. Fredrickson, Ambler, Pa., assignor to I-T-E
Circuit Breaker Company, Philadelphia, Pa., a corporation of Pennsylvania
Filed July 15, 1963, Ser. No. 294,847
20 Claims. (Cl. 185—40)

This invention relates to a novel control system for circuit breakers of the type having a spring closing mechanism, and is more specifically related to an improvement over the type of control system set forth in U.S. Patent 2,961,068 issued November 22, 1960 entitled "Control Mechanism for Spring Close Circuit Breakers" in the name of C. J. Yarrick et al. and assigned to the assignee of the instant invention.

The spring closing mechanism may typically be of the type set forth in U.S. Patent 2,961,067, issued November 22, 1960 entitled "Electrically Operated Stored Energy System for Circuit Breakers" in the name of R. V. Starr and assigned to the assignee of the instant invention, and includes a circuit breaker closing spring and an electrically energizable charging means, such as a motor, for charging the spring. The control system is operatively responsive to the charging spring condition such that the charging motor once energized will remain so energized until the closing spring is brought to a predetermined charged position. The charging motor circuit is then interrupted deenergizing the charging motor. The spring closed mechanism further includes a latch to maintain the spring in the charged position. The control system includes a latch defeat circuit which when energized releases the latch, thereby discharging the spring and closing the circuit breaker contacts. A control switch is provided to activate the latch release mechanism after the closing spring has been charged to its predetermined position. The charging motor may then be reenergized, charging the closing spring for a subsequent closing operation.

Such control systems should preferably include anti-pump protection to avoid a false closing cycle; that is, should the circuit breaker contacts open upon an overload condition while the control switch is still depressed, the latch control circuit should be locked out, preventing it from operating from a maintained contact control switch. Further, the above-described control system should preferably be provided by a minimum number of components operatively related in a simplified manner for increased reliability of control circuit operation.

To provide the above-described operation it has been the practice to use an arrangement of the type set forth in aforementioned U.S. Patent No. 2,961,068, wherein a limit switch, latch defeat coil and lockout coil are provided. In particular, such a prior art control system generally includes a first circuit which controls the charging motor; a second circuit including the latch defeat coil for controlling the discharge of the operating spring after it is charged to a predetermined position by the motor; and a third circuit which includes the lockout coil for defeating energization of the latch release circuit unless certain electrical conditions prevail. The limit switch includes three sets of contacts. These contacts are in series arrangement with the energizing motor, latch coil and lockout coil series circuits respectively. The lockout coil includes two additional sets of contacts to provide interruption of the latch defeat coil and seal the lockout coil in its energized position to prevent a false closing cycle. The first circuit may also include a second contacting device which is operatively associated with the circuit breaker contacts so that the motor circuit can be energized only when the circuits breaker contacts are open. The second circuit includes: the second limit switch contact which is closed when the springs are fully charged; a second contact which is also operatively associated with the circuit breaker contacts to be closed only when the circuit breaker contacts are open; the control switch; and an electrical lockout contact that is opened responsive to the energization of a lockout coil. Thus, the latch release coil can only be energized to discharge the charged closing spring when all these contacts are closed, thus requiring that the charging springs are charged, the circuit breaker contacts are open, the control switch contacts be closed, and the lockout coil be de-energized. The third circuit includes the lockout coil, the control switch and the parallel arrangement of a seal-in contact for the lockout coil, and the third limit switch contact which is closed only when the charging springs are discharged. Accordingly, the lockout coil will be energized, opening the lockout contact in the latch defeat circuit if the control switch contacts are held closed and the closing springs are discharged. Subsequent charging of the closing springs will still result in the lockout coil being energized via the seal-in contact, thereby preventing a false operating cycle.

Since the lockout coil is an independent electromagnetic device with contacts, the prior art arrangements require other control contacts to monitor its action depending on whether or not voltage is maintained on the control switch. My control system provides for a more simplified operation, by combining the functions of the second and third pair of limit switch contacts, both pairs of lockout coil contacts, and the lockout coil into a single contact and coil controlled by a slip coupling on the first limit switch contact.

Basically my invention includes a first circuit similar to the first circuit of the prior art, which includes a pair of limit switch contacts operatively responsive to the charging spring condition and a pair of contacts operatively associated with the circuit breaker condition. A second series circuit is provided which includes a pair of limit switch contacts slip coupled to the first pair of limit switch contacts, such that the driving of the first pair of contacts to the closed position (responsive to the spring being in a discharged condition) will drive the second pair of contacts to the open position. However, this slip coupling will permit the second pair of contacts to be maintained in the open position should the first pair of contacts be subsequently driven to their opened position. The second series circuit also includes the latch defeat coil and a contact operatively associated with the circuit breaker condition, the latter contact preferably being the same contact as is included in the first series circuit. A third series circuit is provided which includes the lockout coil and the control switch. Thus, the lockout coil will be energized responsive to the control switch contacts being maintained. The lockout coil is operatively related with respect to the slip coupling such that if energized when the second pair of limit switch contacts are opened, it will maintain those in their opened position irrespective of the subsequent operation of the first pair of limit switch contacts. However, the lockout coil is of insufficient strength to move the second pair of contacts from their closed to their opened position.

The lockout coil is therefore seen to prevent a false closing cycle by maintaining the second pair of limit switch contacts in their opened position should the control switch be maintained closed while the circuit breaker undergoes a closing and opening cycle, with the springs being subsequently charged. The presence of the energized lockout coil during normal operation of the device will have no deleterious effect, inasmuch as it is unable to pick up the pair of limit switch contacts in their closed position.

A preferred embodiment of my invention may conveniently be obtained by the use of a two-stage rotary controlled limit switch of the type set forth in my copending U.S. patent application Serial No. 122,058 filed June 28, 1961 entitled "Rotary Type Control Switch" and assigned to the assignee of the instant invention. The contact assembly is shaft driven by a connecting rod and crank on the detent housing end and also controlled by the lockout coil mounted on the opposite end of the switch. The slip coupling is provided at the end stage of the switch with the contact shaft being split between the decks of each of the respective contact pairs. The shaft for the first limit switch contact pair is directly driven by the crank and connecting rod from the spring charging motor timing cam, and the shaft for the second pair of limit switch contacts is driven by the armature of the lockout coil. The first limit switch contact is biased to the opened position by means of a spring biased detent housing of the type set forth in the aforementioned U.S. patent application. The second pair of limit switch contacts is biased to the closed position by a return spring being attached to the lockout coil armature and frame housing.

It is thus seen that the basic concept of my invention resides in the simplification of a control system for a spring closed circuit breaker by providing a slip coupling between a first and second pair of limit switch contacts, and including a lockout coil energizable concurrently with the control switch engagement to maintain the second pair of limit switch contacts in their opened position, but being unable to move said second pair of contacts from their closed to their opened position. The basic advantage achieved by my control system is the elimination of a limit switch contact and two relay contacts, resulting in the utmost simplicity of the circuit connections. No standard control requirements are sacrificed with the elimination of the components and simplification of the circuitry resulting in increased reliability. Further, the space requirements of the control system are also appreciably reduced.

Accordingly, a primary object of this invention is to provide a reliable control system for a spring close circuit breaker in a simplified manner with a minimum number of components.

An additional object of this invention is to provide a spring closed circuit breaker control system, including a first and second pair of limit switch contacts; the first pair of contacts being directly responsive to the charging spring condition, and included in the spring charging circuit; and the second pair of contacts being slip-coupled to the first pair of contacts, and included in the spring defeat latch circuit.

A further object of this invention is to provide such a control system which further includes an energizable lockout coil operatively associated with the slip coupled contact to maintain it in its opened position, but being unable to move that contact from a closed to an opened position.

Still another object of this invention is to provide a control system for a spring closed circuit breaker which includes a first and second pair of limit switch contacts, in respective decks of a shaft controlled rotary switch, the shafts of the first and second decks being slip coupled.

Still an additional object of this invention is to provide such a control system wherein the cam operated contacts are constructed to prevent their undesired operation when subjected to shock.

Still a further object of this invention is to provide such a control system wherein the second limit switch shaft is further controlled by a lockout coil armature.

These as well as other objects of this invention will readily become apparent after reading the following descriptions of the accompanying drawings in which:

FIGURE 1 illustrates a perspective view of the closing control mechanism in conjunction with the charging structure of the type set forth in aforementioned U.S. Patent No. 2,961,067. The system is shown with the charging spring shown in its fully charged position.

Figure 4:
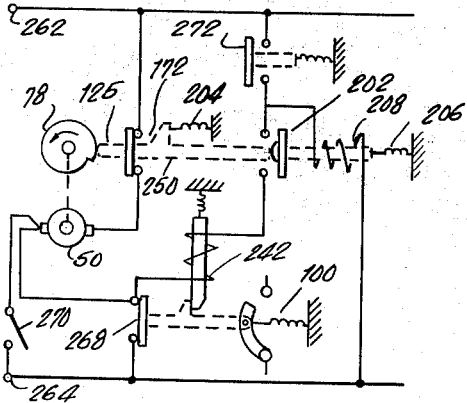

FIGURE 4 schematically shows the control system of my invention during the condition wherein the closing springs are in their charging position, the circuit breaker contacts open, and the control switch open.

Figure 5:
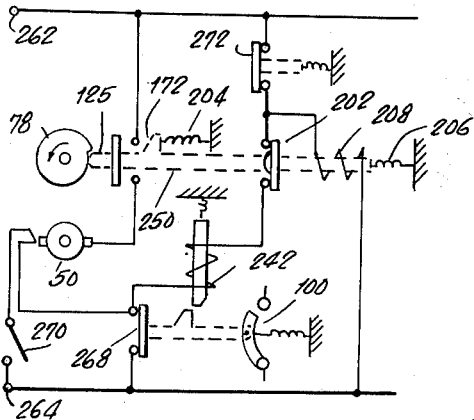

FIGURE 5 schematically shows the control system during the condition wherein the closing spring is fully charged, the control switch is closed and the circuit breaker is about to be closed.

Figure 6:
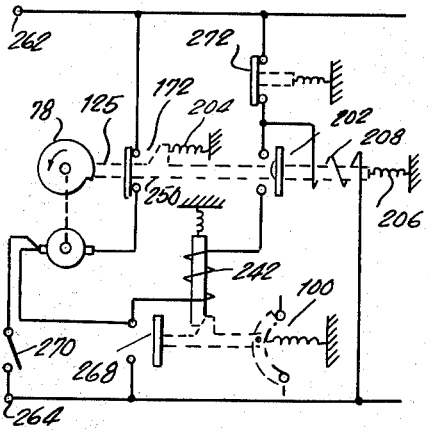

FIGURE 6 schematically shows the condition wherein the circuit breaker has been closed, and the control switch is maintained closed.

Figure 7:
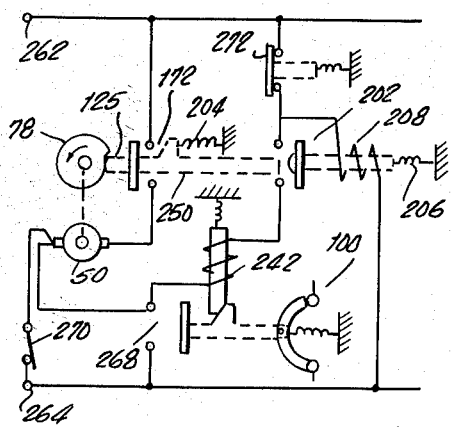

FIGURE 7 corresponds to the condition which illustrates the lockout feature of the invention. The closing spring has been fully charged deenergizing the charging motor. The circuit breaker contacts are closed and the control switch is shown maintained, thereby energizing the lockout coil to interrupt the latch defeat circuit.

FIGURE 8 is an exploded perspective view of the control mechanism operating members.

FIGURE 9 is a cross-sectional view of the control system operating members.

FIGURES 10 and 11 are front and rear views respectively of the control system operating mechanism, looking in the direction of arrows 10—10 and 11—11 respectively of FIGURE 9.

FIGURES 11A, 11B and 11C are open end views of the detent housing first stage limit switch and second stage limit switch operating members, respectively.

FIGURES 12A–E show the shaft actuator detent wheel first stage cam, second stage cam and lockout armature respectively of the operating mechanism in their positions corresponding to the condition shown in FIGURE 4.

FIGURES 13A–E, 14A–E and 15A–E are similar to FIGURE 12, but show the control system operating members in the conditions corresponding to FIGURES 5, 6 and 7 respectively.

Figure 1:
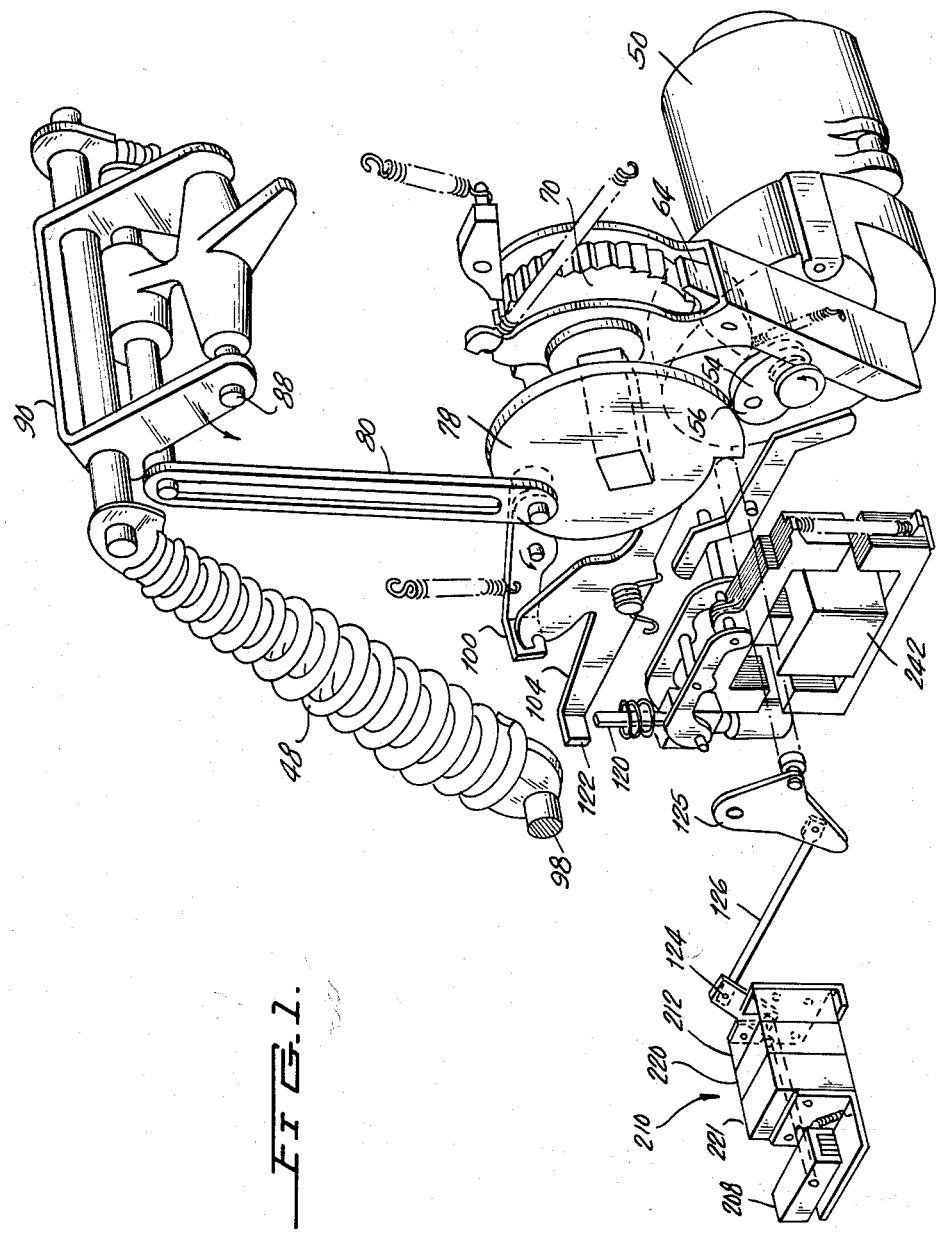
Figure 2:
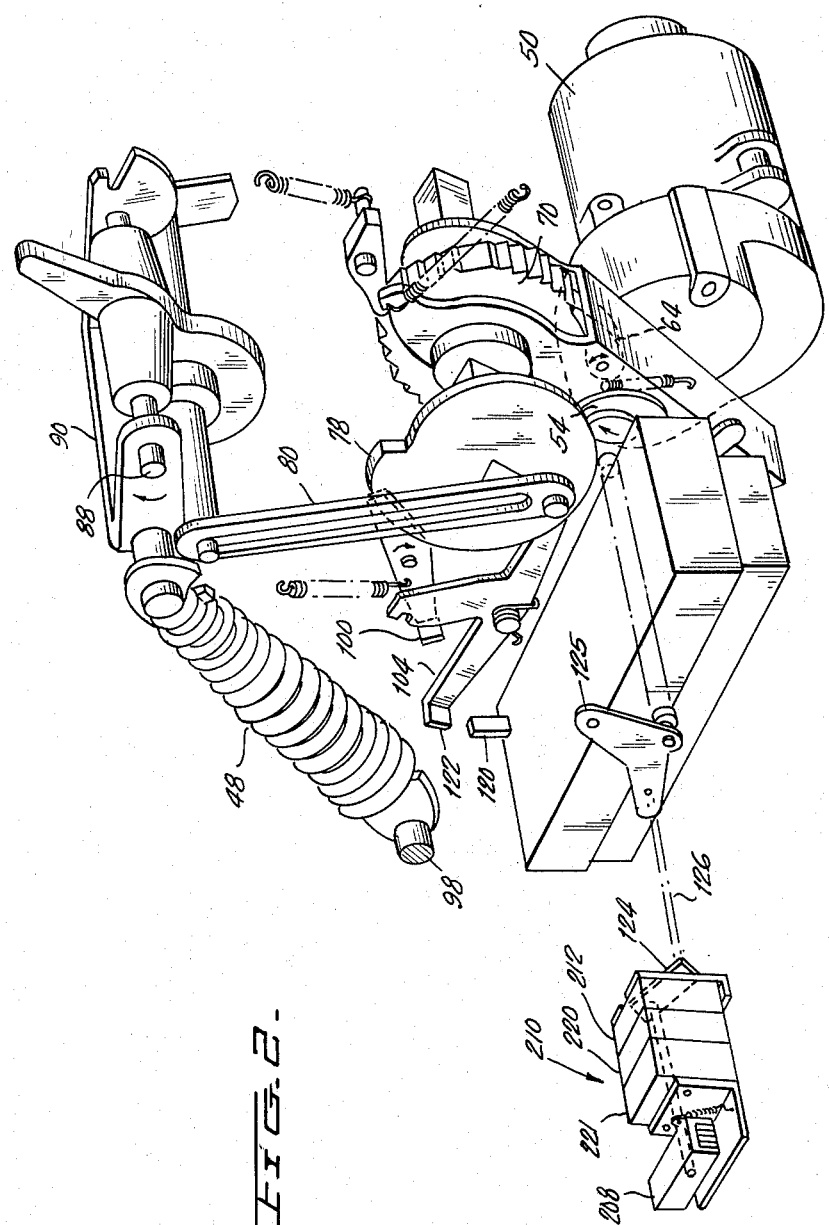
FIGURE 2 is similar to FIGURE 1, showing the system in its discharged position.

My invention is applicable to any type of circuit breaker spring closed mechanism and is illustratively shown in conjunction with the mechanism set forth in aforementioned U.S. Patent No. 2,961,067. For purposes of understanding the operation of my improved control system, a brief description of the closing mechanism follows:

Referring to the figures, energy storing spring 48 is operatively connected to a circuit breaker closing cam (not shown) and is extendible from the position of FIGURE 2 to the position of FIGURE 1, and is latchable to the extended position so as to be discharged at an appropriate time. The spring is charged by motor 50, which when energized drives arm 54 counterclockwise about shaft 56 as indicated by the arrow in FIGURE 1. This brings drive pawl 64 in engagement with ratchet wheel 70. Ratchet wheel 70 is then rotated in a counterclockwise direction from the position of FIGURE 2 to the position of FIGURE 1 rotating output crank 78. Output crank 78 is pivoted to link 80 to drive it upwardly causing rotation of carrier 90 in a clockwise direction about shaft 88. This movement of carrier 90 extends spring 48 which is fixed at its bottom to shaft 98. Primary and secondary latch members 100 and 104 are provided to engage to maintain spring 48 in its charged position. The actuation of plunger 120 against extending leg 122 of secondary closed latch 104 serves as a latch defeat, to thereby permit discharge of closing spring 48 to the position shown in FIGURE 2. Plunger 120 is actuated by a release coil 242 contained in the control system circuitry. Release coil 242 may be of the type shown or alternatively of the plunger type.

Control system

Figure 3:
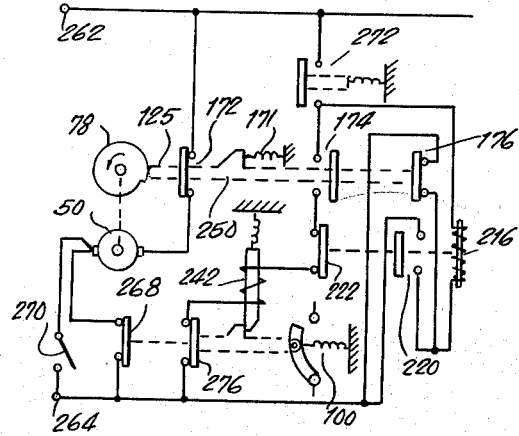
FIGURE 3 illustrates the prior art electrical control system, with the charging circuit timing cam, latch and circuit breaker shown schematically.

Reference is initially made to FIGURE 3, which illustrates the prior art control system over which my invention represents a significant improvement. FIGURE 3 corresponds to the spring being in its charging position prior to closing of the circuit breaker contacts. The control system is energized by a suitable control voltage, either A.C. or D.C. provided at terminals 262, 264. A limit switch had been provided which includes three sets of movable contacts 172, 174, 176 actuated by the cam surface of crank 78. Contact 172 is in a series circuit with spring charging motor 50 and $b$ contact 268 responsive to the condition of circuit breaker 100. A second limit switch contact 174 is included in series circuit with the latch release coil 242, the control switch 272, contact 222 of a lockout coil and another $b$ contact 276 operatively controlled by the circuit breaker. The third limit switch contact 176 is in series relationship with a lockout coil 216 and the control switch 272. Biasing means 171 urges contacts 172, 174 and 176 to the left, as shown in FIGURE 3. The lockout coil 216 controls a second contact 220 in parallel arrangement with limit switch contact 176. The anti-pump protection is provided by lockout relay 216 in conjunction with its contacts 220 and 222. Thus, when control switch 272 is held closed, lockout relay coil 216 is energized, thereby opening contact 222 and closing contact 220. The closing of contact 220 will operate to seal the lockout relay in its energized position. Accordingly, contact 222 will be sealed in its opened position to thereby prevent a subsequent energization of latch release coil 242 to initiate a false closing cycle. It is understood that lockout relay 216 is an independent electromagnetic device controlling two additional sets of contacts 220 and 222. Thus it requires other control contacts to monitor its action depending upon whether or not voltage is maintained on the control switch 272. My control scheme preferably combines the functions of contacts 174, 176, 220 and 222, and lockout coil 216 into one contact and one coil control by a slip coupling on limit switch contact 172 in the charging motor circuit.

Reference is now made to FIGURE 4 which shows the preferred operating arrangement of my invention, in which those components corresponding in operation to the prior art system of FIGURE 3 are similarly numbered. FIGURE 4 shows the condition with the control power applied across contacts 262, 264, the control switch 272 opened, cam 78 in the position corresponding to the circuit breaker closing spring charging and the circuit breaker 100 open. A second pair of limit switch contacts 202 are provided and are slip coupled in the manner generally shown by 250 to limit switch contacts 172. Biasing means 204 and 206 bias contacts 172 and 202 to their closed and opened positions respectively. Lockout coil 208 is shown in operative engagement with contacts 202. In the manner that will be more fully set forth in conjunction with FIGURES 8–15, lockout coil 208 when energized will maintain contact 202 in its opened position. However, should lockout coil 208 be energized while contact 202 is in its closed position, the biasing force of spring 206 to the left is greater than the force to the right created by lockout coil 208, thereby preventing contact 202 to be moved from its closed to its opened position under the influence of lockout coil 208. Latch release coil 242 is in series relationship with respect to control switch 272, limit switch contacts 202 and $b$ contact 268 of the circuit breaker. Lockout coil 208 is in parallel relationship with respect to limit switch contacts 202, latch release coil 242 and $b$ contact 268, and is therefore energized corresponding to engagement of control switch 272.

Control system operation

Reference to FIGURES 4–7, illustrate the sequential operation of my control system.

Referring first to FIGURE 4, the condition is shown during which closing spring 48 is undergoing charging by energized motor 50 prior to the closing of the circuit breaker 100. Cam follower 125 rides along the upper portion of motor timing cam 78, thereby driving contacts 172 into their closed position. Circuit breaker $b$ contact 268 is also closed, completing the series circuit for spring charging motor 50. Slip coupling 250 drives contacts 202 to their opened position, thereby preventing energization of latch defeat coil 242 should control switch 272 be engaged prior to the spring reaching a fully charged position. The motor 50 continues charging the operating spring until timing cam 78 reaches the position shown in FIGURE 5, corresponding to the spring being fully charged.

At this point spring 204 urges limit switch contacts 172 open, while spring 206 urges slip coupled contacts 202 to their closed position. The opening of limit switch contacts 172 deenergizes the charging motor 50. Now, as shown in FIGURE 5, if the control switch 272 is closed and maintained closed, a circuit is completed through control switch 272, contacts 202, latch defeat coil 242, and circuit breaker $b$ contacts 268, thereby energizing the latch defeat coil 242. During this time lockout coil 208 is also energized through control switch 272. However, lockout coil 208 is designed to have insufficient strength to move closed contact 202 to the right in opposition to biasing spring 206 but strong enough to hold contact 202 in an open position once it has been driven there by the timing cam 78 due to the change in reluctance. The energization of release coil 242 effects discharge of operating spring 48 and closing of the circuit breaker 100, to the condition shown in FIGURE 6.

During closing of the circuit breaker, the charging springs 48 are giving up their energy to the circuit breaker, and the timing cam is again rotated to the position corresponding to the discharged spring condition. This action drives contact 172 closed and opens contact 202 through slip coupling 250. Should control switch 272 be maintained in its engaged position, lockout coil will remain energized, thereby holding 202 in its open position, as shown in FIGURE 6. Since circuit breaker control $b$ contact 268 is now opened, the charging motor 50 circuit is deenergized. To permit charging of the spring after the circuit breaker is closed, a parallel circuit including switch 270 is provided to bypass open contact 268. This permits instantaneous spring recharging after the circuit breaker is closed. The closing of switch 270 provides a series circuit through closed contacts 172 to energize charging motor 50, charging the spring and rotating timing cam 78 to the position shown in FIGURE 7. If contact 270 is open, the closing springs are recharged after the circuit breaker 100 is opened. Thus, contacts 172 and 202 remain as shown in FIGURE 6 until circuit breaker 100 is opened.

FIGURE 7 shows the anti-pump operation of my control system. Contacts 172 are opened disengaging the charging motor 50. Should control switch 272 be maintained in a closed position during this time, the holding coil 208 will remain energized and is strong enough to maintain contact 202 in its open position. Thus, it is seen that the slip coupling is designed to (1) allow both contacts 172 and 202 to be directly driven into the positions shown in FIGURE 4, and (2) allow contact 202 to be held open by lockout coil 208 after being driven into that position by the timing cam 78, even though the timing cam is later repositioned to permit contact 172 to return to the opened position, as shown in FIGURE 7.

The above-described operation of the control system provides the necessary anti-pump protection should the circuit breaker 100 open due to an overcurrent or under-voltage condition. Referring to FIGURE 7, should control switch 272 be maintained closed after the circuit breaker opens, lockout coil 208 will be holding contact 202 open, thus preventing release coil 242 from being energized to initiate a false closing cycle. To return the system to its initial condition (as shown in FIGURE 4), it is merely necessary to release control switch 272, which permits contacts 202 to return to their closed condition under the influence of biasing spring 206, and relinquishes the control of lockout coil 208 over contacts 202.

Control mechanism

FIGURES 8–15 illustrate a preferred compact arrangement of a control system constructed in accordance with the teachings of my invention. The slip coupled contact assembly is formed of a two-stage rotary control switch 200 of the type generally shown in the aforementioned copending U.S. patent application, Serial No. 122,058. Switch actuator 124 is driven by timing cam 78 via connecting rod 126 and cam follower 125, which directly rotates shaft 209. Shaft 209 is fixedly secured to detent wheel 207 and first stage operating cam 210. Detent 207 is contained in housing 212 and is biased by operating arms 214, 216 and spring 204 to return to the position shown in FIGURE 11A. Referring to FIGURE 11B it is seen that this shaft position corresponds to first stage cam 210 being in the position wherein cam follower 218 is forced outward, thereby opening the first pair of limit switch contacts 172, in the manner schematically shown in FIGURES 5–7. Limit switch contacts 172 include a cooperating pair of stationary contacts 172a and movable contacts 172b positioned by cam follower 218, responsive to rotation of driving shaft 209. Cam follower 218' may be provided to simultaneously operate a similar set of contacts (not shown) connectible in series with contacts 172a–172b for high motor currents.

The second pair of limit switch contacts 202 are driven by second stage operating cam 220 slip coupled to shaft 209. The slip coupling arrangement is provided by a collar member 222 having a central opening 224 into which shaft 209 partially extends. Opening 224 is appropriately cut out with respect to the square cross-section of shaft 209 to permit relative movement therebetween. A second shaft 226 extends into the opposite end of collar opening 224, and is secured to the armature 228 of lockout relay 208. Shaft 226 has a similar cross-section as shaft 209, and may be angularly disposed with respect thereto. The relative movement of shafts 209 and 226 within collar opening 224 permits armature 228 to provide the lockout protection previously discussed in conjunction with FIGURES 4–7.

The housing sections 212, 252 and 254 of the detent wheel, first stage limit switch, and second stage limit switch are compactly contained in aligned relationship about the axis of split shaft 209, 226. Bolt members 230 extend through aligned openings at the peripheral regions of these rotary switch housings, to thereby secure them in a simple manner to frame members 231, 232. Lockout relay 208 is similarly bolt fastened to housing member 232. Biasing spring 206 is provided to urge shaft 226 to the position corresponding to the closed position of second limit switch contacts 202, as schematically shown in FIGURES 4–7.

Operation of the control mechanism

Reference is made to FIGURES 12–15. These figures correspond to the conditions shown in FIGURES 4–7 respectively and sequentially show the operation of the control mechanism. Referring first to FIGURE 12, the timing cam position corresponds to the circuit breaker charging spring being in the discharged position, thereby causing actuating means 124 to be rotated to its extreme clockwise position, rotating detent wheel 207 clockwise against the biasing effect of spring 204, as shown in FIGURE 12B. Shaft 209 will also rotate first operating cam 210 to a position permitting the closing of first pair of limit switch contacts 172 as shown in FIGURE 12C. Shaft 209 bears against surfaces 240 and 242 of collar opening 224, thereby rotating second stage operating cam 220 to its extreme clockwise position, opening contacts 202 as shown in FIGURE 12D. The clockwise rotation of cam 220 and collar 222 causes shaft 226 to rotate clockwise against the biasing effects of spring 206.

When the charging spring becomes fully charged, the timing cam 78 will be in the position shown in FIGURE 5, causing actuator 124 to move counter-clockwise. Shaft 209 similarly turns counter-clockwise aided by the biasing effect of spring 204 operatively connected to detent wheel 207. Thus, contacts 172 will be biased into their opened position shown in FIGURE 13C. Shaft 209 is free to rotate counter-clockwise within opening 224. However, once the clockwise biased engagement of shaft 209 and collar surfaces 240 and 242 is released, biasing spring 206 unloads to rotate shaft 226 counter-clockwise, thereby closing limit switch contacts 202 by the counter-clockwise rotation of second stage operating cam 220, as shown in FIGURE 13D.

Should the charging motor 50 be reenergized through contact 270, as shown in FIGURE 6, actuator 124 will be rotated clockwise to the position shown in FIGURE 14A, thereby similarly moving detent wheel 207, first operation cam 210 and second operating cam 220 clockwise to their positions shown in FIGURES 14B–D. However, should the control switch 272 be maintained closed during this time, lockout coil 208 will be energized, thereby locking shaft 226 in a position corresponding to contacts 202 being maintained in their open position.

When the spring is fully charged, as shown in FIGURE 7, actuator 124 will again be in its counter-clockwise position thereby permitting detent wheel 207 to return to its unbiased position, and contacts 172 to their opened position. Shaft 226 is again free to rotate clockwise within opening 224 of collar 222. However, second stage operating cam 220 will now be prevented from rotating counter-clockwise by the lockout position of armature 228. That is, shaft 226 is biased against surfaces 244, 246 by the armature to prevent counterclockwise rotation of cam 220, and the resultant engagement of contacts 202. Should relay coil 208 be deenergized, armature 228 will immediately return to its closed position under the biased effect of spring 206, permitting shaft 226 to rotate counter-clockwise to close contacts 202 and initiate a normal cycle of operation.

It is thus seen that I have provided a simplified circuit and mechanism for controlling the operation of a spring closed circuit breaker. In the foregoing I have described my invention in conjunction with a preferred embodiment thereof. Many variations and modifications will now become obvious to those skilled in the art. Accordingly, I prefer to be bound not by the specific disclosure contained herein, but only by the appended claims.

The embodiments of the invention in which an exclusive privilege or property is claimed are defined as follows.

1. A control system for a spring close mechanism of a circuit breaker comprising, a limit switch having a first and second pair of contacts; each of said pair of contacts being movable between an engaged and disengaged position; said first pair of contacts being in a first series circuit including an electrically energizable spring charging means; said second pair of contacts being in a second series circuit including an electrically energizable latch defeating mechanism; an electrically energizable lockout means; a third series circuit including said lockout means, connecting means operatively connecting said first pair of limit switch contacts to said spring close mechanism, coupling means operatively coupling said second pair of limit switch contacts to said first pair of limit switch contacts; said connecting means moving said first pair of limit switch contacts to their engaged and disengaged positions corresponding to the discharged and charged condition respectively of an operating spring; said coupling means moving said second pair of limit switch contacts to their disengaged position when said first pair of limit switch contacts are at their said engaged position; said coupling means permitting said second pair of limit switch contacts to be in said engaged or disengaged position when said first pair of contacts are in their said disengaged position; said energized lockout means maintaining said second pair of contacts in their said disengaged position, thereby interrupting said second series circuit.

2. A control system for a spring close mechanism of a circuit breaker comprising, a limit switch having a first and second pair of contacts; each of said pair of contacts being movable between an engaged and disengaged position; said first pair of contacts being in a first series circuit including an electrically energizable spring charging means; said second pair of contacts being in a second series circuit including an electrically energizable latch defeating mechanism; an electrically energizable lockout means; a third series circuit including said lockout means, connecting means operatively connecting said first pair of limit switch contacts to said spring close mechanism, coupling means operatively coupling said second pair of limit switch contacts to said first pair of limit switch contacts; said connecting means moving said first pair of limit switch contacts to their engaged and disengaged positions corresponding to the discharged and charged condition respectively of an operating spring; said coupling means moving said second pair of limit switch contacts to their disengaged position when said first pair of limit switch contacts are at their said engaged position; said coupling means permitting said second pair of limit switch contacts to be in said engaged or disengaged position when said first pair of contacts are in their said disengaged position; said energized lockout means maintaining said second pair of contacts in their said disengaged position, thereby interrupting said second series circuit; energizing means operatively connected to said first, second and third series circuit; said latch defeating means being energized from said energizing means after said spring is charged and said second pair of limit switch contacts are engaged; said third series circuit being connected in circuit relation with respect to said second series circuit to be simultaneously connected to said energizing means; said lockout means maintaining said second pair of limit switch contacts in said disengaged position after said spring is discharged with said second series circuit remaining connected to said energizing means.

3. A control system for a spring close mechanism of a circuit breaker comprising, a limit switch having a first and second pair of contacts; each of said pair of contacts being movable between an engaged and disengaged position; said first pair of contacts being in a first series circuit including an electrically energizable spring charging means; said second pair of contacts being in a second series circuit including an electrically energizable latch defeating mechanism; an electrically energizable lockout means; a third series circuit including said lockout means, connecting means operatively connecting said first pair of limit switch contacts to said spring close mechanism, coupling means operatively coupling said second pair of limit switch contacts to said first pair of limit switch contacts; said connecting means moving said first pair of limit switch contacts to their engaged and disengaged positions corresponding to the discharged and charged condition respectively of an operating spring; said coupling means moving said second pair of limit switch contacts to their disengaged position when said first pair of limit switch contacts are at their said engaged position; said coupling means permitting said second pair of limit switch contacts to be in said engaged or disengaged position when said first pair of contacts are in their said disengaged position; said energized lockout means maintaining said second pair of contacts in their said disengaged position, thereby interrupting said second series circuit; energizing means operatively connected to said first, second and third series circuit; said latch defeating means being energized from said energizing means after said spring is charged and said second pair of limit switch contacts are engaged; said third series circuit being connected in circuit relation with respect to said second series circuit to be simultaneously connected to said energizing means; said lockout means maintaining said second pair of limit switch contacts in said disengaged position after said spring is discharged with said second series circuit remaining connected to said energizing means; means biasing said second pair of limit switch contacts to said engaged position; said biasing means preventing said energized lockout means from moving said second pair of contacts from said engaged to said disengaged position; the disconnection of said second series circuit from said energizing means de-energizing said lockout means, whereby said lockout maintained second pair of limit switch contacts returns to its said engaged position under the influence of said biasing means.

4. A control system for a spring close mechanism of a circuit breaker comprising, a limit switch having a first and second pair of contacts; each of said pair of contacts being movable between an engaged and disengaged position; said first pair of contacts being in a first series circuit including an electrically energizable spring charging means; said second pair of contacts being in a second series circuit including an electrically energizable latch defeating mechanism; an electrically energizable lockout means; a third series circuit including said lockout means, connecting means operatively connecting said first pair of limit switch contacts to said spring close mechanism; coupling means operatively coupling said second pair of limit switch contacts to said first pair of limit switch contacts; said connecting means moving said first pair of limit switch contacts to their engaged and disengaged positions corresponding to the discharged and charged condition respectively of an operating spring; said coupling means moving said second pair of limit switch contacts to their disengaged position when said first pair of limit switch contacts are at their said engaged position; said coupling means permitting said second pair of limit switch contacts to be in said engaged or disengaged position when said first pair of contacts are in their said disengaged position; said energized lockout means maintaining said second pair of contacts in their said disengaged position, thereby interrupting said second series circuit; energizing means operatively connected to said first, second and third series circuit; said latch defeating means being energized from said energizing means after said spring is charged and said second pair of limit switch contacts are engaged; said third series circuit being connected in circuit relation with respect to said second series circuit to be simultaneously connected to said energizing means; said lockout means maintaining said second pair of limit switch contacts in said disengaged position after said spring is discharged with said second series circuit remaining connected to said energizing means; said limit switch including first and second operating members to be positioned between first and second locations to move said first and second pair of contacts respectively between said engaged and disengaged positions; actuating means operatively connecting said first and second operating members to said spring close mechanism, said coupling means providing a slip coupling engagement between said actuating means and said operating members.

5. A control system for a spring close mechanism of a circuit breaker comprising, a limit switch having a first and second pair of contacts; each of said pair of contacts being movable between an engaged and disengaged position; said first pair of contacts being in a first series circuit including an electrically energizable spring charging means; said second pair of contacts being in a second series circuit including an electrically energizable latch defeating mechanism; an electrically energizable lockout means; a third series circuit including said lockout means, connecting means operatively connecting said first pair of limit switch contacts to said spring close mechanism, coupling means operatively coupling said second pair of limit switch contacts to said first pair of limit switch contacts; said connecting means moving said first pair of limit switch contacts to their engaged and disengaged positions corresponding to the discharged and charged condition respectively of an operating spring; said coupling means moving said second pair of limit switch contacts to their disengaged position when said first pair of limit switch contacts are at their said engaged position; said coupling means permitting said second pair of limit switch contacts to be in said engaged or disengaged position when said first pair of contacts are in their said disengaged position; said energized lockout means maintaining said second pair of contacts in their said disengaged position, thereby interrupting said second series circuit; energizing means operatively connected to said first, second and third series circuit; said latch defeating means being energized from said energizing means after said spring is charged and said second pair of limit switch contacts are engaged; said third series circuit being connected in circuit relation with respect to said second series circuit to be simultaneously connected to said energizing means; said lockout means maintaining said second pair of limit switch contacts in said disengaged position after said spring is discharged with said second series circuit remaining connected to said energizing means; said limit switch including first and second operating members to be positioned between first and second operating members to be positioned between first and second locations to move said first and second pair of contacts respectively between said engaged and disengaged positions; actuating means operatively connecting said first and second operating members to said spring close mechanism, said coupling means providing a slip coupling engagement between said actuating means and said operating members; said first and second operating members being rotatively supported about said actuating means; said actuating means including a shaft fixedly secured to said first operating member; collar means positioned intermediate said shaft and said second operating member; said collar means engaging said shaft during rotation of said shaft in a first direction, the rotation of said shaft in the opposite direction permitting predetermined relative rotation of said shaft and said second operating member.

6. A control system for a spring close mechanism of a circuit breaker comprising, a limit switch having a first and second pair of contacts; each of said pair of contacts being movable between an engaged and disengaged position; said first pair of contacts being in a first series circuit including an electrically energizable spring charging means; said second pair of contacts being in a second series circuit including an electrically energizable latch defeating mechanism; an electrically energizable lockout means; a third series circuit including said lockout means, connecting means operatively connecting said first pair of limit switch contacts to said spring close mechanism, coupling means operatively coupling said second pair of limit switch contacts to said first pair of limit switch contacts; said connecting means moving said first pair of limit switch contacts to their engaged and disengaged positions corresponding to the discharged and charged condition respectively of an operating spring; said coupling means moving said second pair of limit switch contacts to their disengaged position when said first pair of limit switch contacts are at their said engaged position; said coupling means permitting said second pair of limit switch contacts to be in said engaged or disengaged position when said first pair of contacts are in their said disengaged position; said energized lockout means maintaining said second pair of contacts in their said disengaged position, thereby interrupting said second series circuit; energizing means operatively connected to said first, second and third series circuit; said latch defeating means being energized from said energizing means after said spring is charged and said second pair of limit switch contacts are engaged; said third series circuit being connected in circuit relation with respect to said second series circuit to be simultaneously connected to said energizing means; said lockout means maintaining said second pair of limit switch contacts in said disengaged position after said spring is discharged with said second series circuit remaining connected to said energizing means; said limit switch including first and second operating members to be positioned between first and second locations to move said first and second pair of contacts respectively between said engaged and disengaged positions; actuating means operatively connecting said first and second operating members to said spring close mechanism, said coupling means providing a slip coupling engagement between said actuating means and said operating members; said first and second operating members being rotatively supported about said actuating means; said actuating means including a shaft fixedly secured to said first operating member; collar means positioned intermediate said shaft and said second operating member; said collar means engaging said shaft during rotation of said shaft in a first direction, the rotation of said shaft in the opposite direction permitting predetermined relative rotation of said shaft and said second operating member; said lockout means comprising an electromagnetic structure, said electromagnetic structure including an armature operatively connected to a second shaft, said second shaft extending into said collar means, said first and second shafts being in approximate coaxial alignment.

7. In a control system for a spring close mechanism; said spring close mechanism including an electrically energizable charging means for charging a spring, latch means for latching said spring in a charged position, and electrically energizable latch defeating means for defeating said latch; a limit switch means; said limit switch means being positioned with respect to said spring close mechanism to be operated to a first position when said spring is charged, and to a second position when said spring is in a discharged condition; said limit switch means including a first and second pair of limit switch contacts movable between an engaged and disengaged position; said first pair of limit switch contacts being in their said disengaged positions when said limit switch is in said first position and said spring is charged, and being in their said engaged positions when said limit switch is in said second position and said spring is discharged; coupling means operatively connecting said first and second pair of limit switch contacts to said disengaged position when said limit switch is in said second position and said spring is discharged; a lockout means operatively connected to said second pair of limit switch contacts for maintaining said second pair of limit switch contacts in their said disengaged position; a lockout energizing means for operating said lockout means; said coupling means permitting said first pair of limit switch contacts to move to said disengaged position while said energized lockout means maintains said second pair of limit switch contacts in said disengaged position; an energizing means; said energizing means connected in a first series circuit including said first pair of limit switch contacts and said electrically energizable charging means, and a second series circuit including said second pair of limit switch contacts and said energizable latch defeat means; said latch defeating means being energized from said energizing means after said spring is charged and said second pair of limit switch contacts are engaged.

8. In a control system for a spring close mechanism; said spring close mechanism including an electrically energizable charging means for charging a spring, latch means for latching said spring in a charged position, and electrically energizable latch defeating means for defeating said latch; a limit switch means; said limit switch means being positioned with respect to said spring close mechanism to be operated to a first position when said spring is charged, and to a second position when said spring is in a discharged condition; said limit switch means including a first and second pair of limit switch contacts movable between an engaged and disengaged position; said first pair of limit switch contacts being in their said disengaged positions when said limit switch is in said first position and said spring is charged, and being in their said engaged positions when said limit switch is in said second position and said spring is discharged; coupling means operatively connecting said first and second pair of limit switch contacts; said coupling means moving said second pair of limit switch contacts to said disengaged position when said limit switch is in said second position and said spring is discharged; a lockout means operatively connected to said second pair of limit switch contacts for maintaining said second pair of limit switch contacts in their said disengaged position; a lockout energizing means for operating said lockout means; said coupling means permitting said first pair of limit switch contacts to move to said disengaged position while said energized lockout means maintains said second pair of limit switch contacts in said disengaged position; an energizing means; said energizing means connected in a first series circuit including said first pair of limit switch contacts and said electrically energizable charging means, and a second series circuit including said second pair of limit switch contacts and said energizable latch defeat means; said lockout means maintaining said second pair of limit switch contacts in said disengaged position after said spring is discharged with said second series circuit remaining connected to said energizing means.

9. In a control system for a spring close mechanism; said spring close mechanism including an electrically energizable charging means for charging a spring, latch means for latching said spring in a charged position, and electrically energizable latch defeating means for defeating said latch; a limit switch means; said limit switch means being positioned with respect to said spring close mechanism to be operated to a first position when said spring is charged, and to a second position when said spring is in a discharged condition; said limit switch means including a first and second pair of limit switch contacts movable between an engaged and disengaged position; said first pair of limit switch contacts being in their said disengaged positions when said limit switch is in said first position and said spring is charged, and being in their said engaged positions when said limit switch is in said second position and said spring is discharged; coupling means operatively connecting said first and second pair of limit switch contacts; said coupling means moving said second pair of limit switch contacts to said disengaged position when said limit switch is in said second position and said spring is discharged; a lockout means operatively connected to said second pair of limit switch contacts for maintaining said second pair of limit switch contacts in their said disengaged position; a lockout energizing means for operating said lockout means; said coupling means permitting said first pair of limit switch contacts to move to said disengaged position while said energized lockout means maintains said second pair of limit switch contacts in said disengaged position while said energized lockout means maintains said second pair of limit switch contacts in said disengaged position; an energizing means; said energizing means connected in a first series circuit including said first pair of limit switch contacts and said electrically energizable charging means, and a second series circuit including said second pair of limit switch contacts and said energizable latch defeat means; said latch defeating means being energized from said energizing means after said spring is charged and said second pair of limit switch contacts are engaged; said lockout means maintaining said second pair of limit switch contacts in said disengaged position after said spring is discharged with said second series circuit remaining connected to said energizing means.

10. In a control system for a spring close mechanism; said spring close mechanism including an electrically energizable charging means for charging a spring, latch means for latching said spring in a charged position, and electrically energizable latch defeating means for defeating said latch; a limit switch means; said limit switch means being positioned with respect to said spring close mechanism to be operated to a first position when said spring is charged, and to a second position when said spring is in a discharged condition; said limit switch means including a first and second pair of limit switch contacts movable between an engaged and disengaged position; said first pair of limit switch contacts being in their said disengaged positions when said limit switch is in said first position and said spring is charged, and being in their said engaged positions when said limit switch is in said second position and said spring is discharged; coupling means operatively connecting said first and second pair of limit switch contacts; said coupling means moving said second pair of limit switch contacts to said disengaged position when said limit switch is in said second position and said spring is discharged; a lockout means operatively connected to said second pair of limit switch contacts for maintaining said second pair of limit switch contacts in their said disengaged position; a lockout energizing means for operating said lockout means; said coupling means permitting said first pair of limit switch contacts to move to said disengaged position while said energized lockout means maintains said second pair of limit switch contacts in said disengaged position; an energizing means; said energizing means connected in a first series circuit including said first pair of limit switch contacts and said electrically energizable charging means, and a second series circuit including said second pair of limit switch contacts and said energizable latch defeat means; said lockout means preventing the energizing of said latch defeat means after said spring has undergone a charge-discharge cycle and is again charged while said second series circuit remains connected to said energizing means.

11. In a control system for a spring close mechanism; said spring close mechanism including an electrically energizable charging means for charging a spring, latch means for latching said spring in a charged position, and electrically energizable latch defeating means for defeating said latch; a limit switch means; said limit switch means being positioned with respect to said spring close mechanism to be operated to a first position when said spring is charged, and to a second position when said spring is in a discharged condition; said limit switch including a first and second pair of limit switch contacts movable between an engaged and disengaged position; said first pair of limit switch contacts being in their said disengaged positions when said limit switch is in said first position and said spring is charged, and being in their said engaged positions when said limit switch is in said second position and said spring is discharged; coupling means operatively connecting said first and second pair of limit switch contacts; said coupling means moving said second pair of limit switch contacts to said disengaged position when said limit switch is in said second position and said spring is discharged; a lockout means operatively connected to said second pair of limit switch contacts for maintaining said second pair of limit switch contacts in their said disengaged position; a lockout energizing means for operating said lockout means; said coupling means permitting said first pair of limit switch contacts to move to said disengaged position while said energized lockout means maintains said second pair of limit switch contacts in said disengaged position; an energizing means; said energizing means connected in a first series circuit including said first pair of limit switch contacts and said electrically energizable charging means, and a second series circuit including said second pair of limit switch contacts and said energizable latch defeat means; said lockout energizing means being connected in circuit relation with respect to said second series circuit to be energized when said second series circuit is connected to said energizing means.

12. In a control system for a spring close mechanism; said spring close mechanism including an electrically energizable charging means for charging a spring, latch means for latching said spring in a charged position, and electrically enerizable latch defeating means for defeating said latch; a limit switch means; said limit switch means being positioned with respect to said spring close mechanism to be operated to a first position when said spring is charged, and to a second position when said spring is in a discharged condition; said limit switch means including a first and second pair of limit switch contacts movable between an engaged and disengaged position; said first pair of limit switch contacts being in their said disengaged positions when said limit switch is in said first position and said spring is charged, and being in their said engaged positions when said limit switch is in said second position and said spring is discharged; coupling means operatively connecting said first and second pair of limit switch contacts; said coupling means moving said second pair of limit switch contacts to said disengaged position when said limit switch is in said second position and said spring is discharged; a lockout means operatively connected to said second pair of limit switch contacts for maintaining said second pair of limit switch contacts in their said disengaged position; a lockout energizing means for operating said lockout means; said coupling means permitting said first pair of limit switch contacts to move to said disengaged position while said energized lockout means maintains said second pair of limit switch contacts in said disengaged position; an energizing means; said energizing means connected in a first series circuit including said first pair of limit switch contacts and said electrically energizable charging means, and a second series circuit including said second pair of limit switch contacts and said energizable latch defeat means; said lockout means being energizable when said second pair of limit switch contacts are in said first or second positions; the energizing of said lockout means when said second pair of limit switch contacts are in said second position maintaining said second pair of limit switch contacts in said disengaged position, the energizing of said lockout means when said second pair of limit switches are in said engaged position having no effect on the positioning of said second pair of limit switch contacts.

13. In a control system for a spring close mechanism; said spring close mechanism including an electrically energizable charging means for charging a spring, latch means for latching said spring in a charged position, and electrically energizable latch defeating means for defeating said latch; a limit switch means; said limit switch means being positioned with respect to said spring close mechanism to be operated to a first position when said spring is charged, and to a second position when said spring is in a discharged condition; said limit switch means including a first and second pair of limit switch contacts movable between an engaged and disengaged position; said first pair of limit switch contacts being in their said disengaged positions when said limit switch is in said first position and said spring is charged, and being in their said engaged positions when said limit switch is in said second position and said spring is discharged; coupling means operatively connecting said first and second pair of limit switch contacts; said coupling means moving said second pair of limit switch contacts to said disengaged position when said limit switch is in said second position and said spring is discharged; a lockout means operatively connected to said second pair of limit contacts for maintaining said second pair of limit switch contacts in their said disengaged position; a lockout energizing means for operating said lockout means; said coupling means permitting said first pair of limit switch contacts to move to said disengaged position while said energized lockout means maintains said second pair of limit switch contacts in said disengaged position; an energizing means; said energizing means connected in a first series circuit including said first pair of limit switch contacts and said electrically energizable charging means, and a second series circuit including said second pair of limit switch contacts and said energizable latch defeat means; means biasing said second pair of limit switch contacts to said engaged position; said biasing means preventing said energized lockout means from moving said second pair of contacts from said engaged to said disengaged position.

14. In a control system for a spring close mechanism; said spring close mechanism including an electrically energizable charging means for charging a spring, latch means for latching said spring in a charged position, and electrically energizable latch defeating means for defeating said latch; a limit switch means; said limit switch means being positioned with respect to said spring close mechanism to be operated to a first position when said spring is charged, and to a second position when said spring is in a discharged condition; said limit switch means including a first and second pair of limit switch contacts movable between an engaged and disengaged position; said first pair of limit switch contacts being in their said disengaged positions when said limit switch is in said first position and said spring is charged, and being in their said engaged positions when said limit switch is in said second position and said spring is discharged; coupling means operatively connecting said first and second pair of limit switch contacts; said coupling means moving said second pair of limit switch contacts to said disengaged position when said limit switch is in said second position and said spring is discharged; a lockout means operatively connected to said second pair of limit switch contacts for maintaining said second pair of limit switch contacts in their said disengaged position; a lockout energizing means for operating said lockout means; said coupling means permitting said first pair of limit switch contacts to move to said disengaged position while said energized lockout means maintains said second pair of limit switch contacts in said disengaged position; an energizing means; said energizing means connected in a first series circuit including said first pair of limit switch contacts and said electrically energizable charging means, and a second series circuit including said second pair of limit switch contacts and said energizable latch defeat means; said latch defeating means being energized from said energizing means after said spring is charged and said second pair of limit switch contacts are engaged; said lockout means preventing the energizing of said latch defeat means after said spring has undergone a charge-discharge cycle and is again charged while said second series circuit remains connected to said energizing means; said lockout energizing means being connected in circuit relation with respect to said second series circuit to be energized when said second series circuit is connected to said energizing means; means biasing said second pair of limit switch contacts to said engaged position; said biasing means preventing said energized lockout means from moving said second pair of contacts from said engaged to said disengaged position.

15. In a control system for a spring close mechanism; said spring close mechanism including an electrically energizable charging means for charging a spring, latch means for latching said spring in a charged position, and electrically energizable latch defeating means for defeating said latch; a limit switch means; said limit switch means being positioned with respect to said spring close mechanism to be operated to a first position when said spring is charged, and to a second position when said spring is in a discharged condition; said limit switch means including a first and second pair of limit switch contacts movable between an engaged and disengaged position; said first pair of limit switch contacts being in their said disengaged positions when said limit switch is in said first position and said spring is charged, and being in their said engaged positions when said limit switch is in said second position and said spring is discharged; coupling means operatively connecting said first and second pair of limit switch contacts; said coupling means moving said second pair of limit switch contacts to said disengaged position when said limit switch is in said second position and said spring is discharged; a lockout means operatively connected to said second pair of limit switch contacts for maintaining said second pair of limit switch contacts in their said disengaged position; a lockout energizing means for operating said lockout means; said coupling means permitting said first pair of limit switch contacts to move to said disengaged position while said energized lockout means maintains said second pair of limit switch contacts in said disengaged position; an energizing means; said energizing means connected in a first series circuit including said first pair of limit switch contacts and said electrically energizable charging means, and a second series circuit including said second pair of limit switch contacts and said energizable latch defeat means; a load for said spring closed mechanism operatively connected to said spring; said load being driven from a first position to a second position responsive to a discharge of said spring from said charged position; a switch means movable between an engaged and disengaged position; said switch means being operatively connectible to said load to be positioned in one of its said engaged or disengaged positions when said load is in said first position and to be positioned in the other of its said engaged or disengaged positions when said load is in said second position; said switch means being connected in circuit relation with respect to said electrically energizable charging means and said latch defeating means and said energizing means to deenergize said electrically energizable charging means and said latch defeating means when said load is moved from said first position to said second position and switch means is moved from its said engaged or disengaged position to the other of its said engaged or disengaged position.

16. In a control system for a spring close mechanism; said spring close mechanism including an electrically energizable charging means for charging a spring, latch means for latching said spring in a charged position, and electrically energizable latch defeating means for defeating said latch; a limit switch means; said limit switch means being positioned with respect to said spring close mechanism to be operated to a first position when said spring is charged, and to a second position when said spring is in a discharged condition; said limit switch means including a first and second pair of limit switch contacts movable between an engaged and disengaged position; said first pair of limit switch contacts being in their said disengaged positions when said limit switch is in said first position and said spring is charged, and being in their said engaged positions when said limit switch is in said second position and said spring is discharged; coupling means operatively connecting said first and second pair of limit switch contacts; said coupling means moving said second pair of limit switch contacts to said disengaged position when said limit switch is in said second position and said spring is discharged; a lockout means operatively connected to said second pair of limit switch contacts for maintaining said second pair of limit switch contacts in their said disengaged position; a lockout energizing means for operating said lockout means; said coupling means permitting said first pair of limit switch contacts to move to said disengaged position while said energized lockout means maintains said second pair of limit switch contacts in said disengaged position; an energizing means; said energizing means connected in a first series circuit including said first pair of limit switch contacts and said electrically energizable charging means, and a second series circuit including said second pair of limit switch contacts and said energizable latch defeat means; said limit switch including first and second operating members to be positioned between first and second locations to move said first and second pair of contacts respectively between said engaged and disengaged positions; actuating means operatively connecting said first and second operating members to said spring close mechanism, said coupling means providing a slip coupling engagement between said actuating means and said operating members.

17. In a control system for a spring close mechanism; said spring close mechanism including an electrically energizable charging means for charging a spring, latch means for latching said spring in a charged position, and electrically energizable latch defeating means for defeating said latch; a limit switch means; said limit switch means being positioned with respect to said spring close mechanism to be operated to a first position when said spring is charged, and to a second position when said spring is in a discharged condition; said limit switch means including a first and second pair of limit switch contacts movable between an engaged and disengaged position; said first pair of limit switch contacts being in their said disengaged positions when said limit switch is in said first position and said spring is charged, and being in their said engaged positions when said limit switch is in said second position and said spring is discharged; coupling means operatively connecting said first and second pair of limit switch contacts; said coupling means moving said second pair of limit switch contacts to said disengaged position when said limit switch is in said second position and said spring is discharged; a lockout means operatively connected to said second pair of limit switch contacts for maintaining said second pair of limit switch contacts in their said disengaged position; a lockout energization means for operating said lockout means; said coupling means permitting said first pair of limit switch contacts to move to said disengaged position while said energized lockout means maintains said second pair of limit switch contacts in said disengaged position; an energizing means; said energizing means connected in a first series circuit including said first pair of limit switch contacts and said electrically energizable charging means, and a second series circuit including said second pair of limit switch contacts and said energizable latch defeat.

18. In a control system for a spring close mechanism; said spring close mechanism including an electrically energizable charging means for charging a spring, latch means for latching said spring in a charged position, and electrically energizable latch defeating means for defeating said latch; a limit switch means; said limit switch means being positioned with respect to said spring close mechanism to be operated to a first position when said spring is charged, and to a second position when said spring is in a discharged condition; said limit switch means including a first and second pair of limit switch contacts moveable between an engaged and disengaged position; said first pair of limit switch contacts being in their said disengaged positions when said limit switch is in said first position and said spring is charged, and being in their said engaged positions when said limit switch is in said second position and said spring is discharged; coupling means operatively connecting said first and second pair of limit switch contacts; said coupling means moving said second pair of limit switch contacts to said disengage position when said limit switch is in said second position and said spring is discharged; a lockout means operatively connected to said second pair of limit switch contacts for maintaining said second pair of limit switch contacts in their said disengaged position; a lockout energizing means for operating said lockout means; said coupling means permitting said first pair of limit switch contacts to move to said disengaged position which said energized lockout means maintains said second pair of limit switch contacts in said disengaged position; an energizing means; said energizing means connected in a first series circuit including said first pair of limit switch contacts and said electrically energizable charging means, and a second series circuit including said second pair of limit switch contacts and said energizable latch defeat means; said latch defeating means being energized from said energizing means after said spring is charged and said second pair of limit switch contacts are engaged; said lockout means preventing the energizing of said latch defeat means after said spring has undergone a charge-discharge cycle and is again charged while said second series circuit remains connected to said energizing means; said lockout energizing means being connected in circuit relation with respect to said second series circuit to be energized when said second series circuit is connected to said energizing means; means biasing said second pair of limit switch contacts to said energized position; said biasing means preventing said energized lockout means from moving said second pair of contacts from said engaged to said disengaged position; said first and second operating members being rotatively supported about said actuating means; said actuating means including a shaft fixedly secured to said first operating member; collar means positioned intermediate said shaft and said second operating member; said collar means engaging said shaft during rotation of said shaft in a first direction, the rotation of said shaft in the opposite direction permitting predetermined relative rotation of said shaft and said second operating member.

19. In a control system for a spring close mechanism; said spring close mechanism including an electrically energizable charging means for charging a spring, latch means for latching said spring in a charged position, and electrically energizable latch defeating means for defeating said latch; a limit switch means; said limit switch means being positioned with respect to said spring close mechanism to be operated to a first position when said spring is charged, and to a second position when said spring is in a discharged condition; said limit switch means including a first and second pair of limit switch contacts movable between an engaged and disengaged position; said first pair of limit switch contacts being in their said disengaged positions when said limit switch is in said first position and said spring is charged, and being in their said engaged positions when said limit switch is in said second position and said spring is discharged; coupling means operatively connecting said first and second pair of limit switch contacts; said coupling means moving said second pair of limit switch contacts to said disengaged position when said limit switch is in said second position and said spring is discharged; a lockout means operatively connected to said second pair of limit switch contacts for maintaining said second pair of limit switch contacts in their said disengaged position; a lockout energizing means for operating said lockout means; said coupling means permitting said first pair of limit switch contacts to move to said disengaged position while said energized lockout means maintains said second pair of limit switch contacts in said disengaged position; an energizing means; said energizing means connected in a first series circuit including said first pair of limit switch contacts and said electrically energizable charging means, and a second series circuit including said second pair of limit switch contacts and said energizable latch defeat means; said limit switch including first and second operating members to be positioned between first and second locations to move said first and second pair of contacts respectively between said engaged and disengaged positions; actuating means operatively connecting said first and second operating members to said spring close mechanism, said coupling means providing a slip coupling engagement between said actuating means and said operating members, said lockout means comprising an electromagnetic structure, said electromagnetic structure including an armature operatively connected to a shaft, said shaft extending into a collar means, said shaft being in approximate coaxial alignment with a second shaft which operates said first pair of limit switch contacts.

20. In a control system for a spring close mechanism; said spring close mechanism including an electrically energizable charging means for charging a spring, latch means for latching said spring in a charged position, and electrically energizable latch defeating means for defeating said latch; a limit switch means; said limit switch means being positioned with respect to said spring close mechanism to be operated to a first position when said spring is charged, and to a second position when said spring is in a discharged condition; said limit switch means including a first and second pair of limit switch contacts movable between an engaged and disengaged position; said first pair of limit switch contacts being in their said disengaged positions when said limit switch is in said first position and said spring is charged, and being in their said engaged positions when said limit switch is in said second position and said spring is discharged; coupling means operatively connecting said first and second pair of limit switch contacts; said coupling means moving said second pair of limit switch contacts to said disengaged position when said limit switch is in said second position and said spring is discharged; a lockout means operatively connected to said second pair of limit switch contacts for maintaining said second pair of limit switch contacts in their said disengaged position; a lockout energizing means for operating said lockout means; said coupling means permitting said first pair of limit switch contacts to move to said disengaged position while said energized lockout means maintains said second pair of limit switch contacts in said disengaged position; an energizing means; said energizing means connected in a first series circuit including said first pair of limit switch contacts and said electrically energizable charging means, and a second series circuit including said second pair of limit switch contacts and said energizable latch defeat means; said latch defeating means being energized from said energizing means after said spring is charged and said second pair of limit switch contacts are engaged; said lockout means maintaining said second pair of limit switch contacts in said disengaged position after said spring is discharged with said second series circuit remaining connected to said energizing means; said lockout energizing means being connected in circuit relation with respect to said second series circuit to be energized when said second series circuit is connected to said energizing means; said first and second operating members being rotatively supported about said actuating means; said actuating means including a shaft fixedly secured to said first operating member; collar means positioned intermediate said shaft and said second operating member; said collar means engaging said shaft during rotation of said shaft in a first direction, the rotation of said shaft in the opposite direction permitting predetermined relative rotation of said shaft and said second operating member; said lockout means comprising an electromagnetic structure, said electromagnetic structure including an armature operatively connected to a second shaft, said second shaft extending into said collar means, said first and second shaft being in approximate coaxial alignment; means biasing said second pair of limit switch contacts to said engaged position; said biasing means preventing said energized lockout means from moving said second pair of contacts from said engaged to said disengaged position; said biasing means comprising a spring element urging said armature to a predetermined location.

References Cited by the Examiner
UNITED STATES PATENTS

| | | | |
|---|---|---|---|
| 2,868,330 | 1/59 | Coswell | 185—37 |
| 2,961,067 | 11/60 | Starr | 185—40 |
| 2,961,068 | 11/60 | Yarrick et al. | 185—40 |

JULIUS E. WEST, *Primary Examiner.*